(12) United States Patent  
Mathieu et al.

(10) Patent No.: US 11,775,794 B2  
(45) Date of Patent: Oct. 3, 2023

(54) BIOMETRIC SENSOR MODULE FOR A SMART CARD AND METHOD FOR MANUFACTURING SUCH A MODULE

(71) Applicant: Linxens Holding, Mantes la Jolie (FR)

(72) Inventors: Christophe Mathieu, Mantes la Jolie (FR); Claire Laurens De Lopez, Verneuil sur Seine (FR)

(73) Assignee: Linxens Holding, Mantes la Jolie (FR)

( * ) Notice: Subject to any disclaimer, the term of this patent is extended or adjusted under 35 U.S.C. 154(b) by 32 days.

(21) Appl. No.: 17/603,799

(22) PCT Filed: Apr. 16, 2020

(86) PCT No.: PCT/FR2020/000128  
§ 371 (c)(1),  
(2) Date: Oct. 14, 2021

(87) PCT Pub. No.: WO2020/212660  
PCT Pub. Date: Oct. 22, 2020

(65) Prior Publication Data  
US 2022/0215220 A1 Jul. 7, 2022

(30) Foreign Application Priority Data  
Apr. 19, 2019 (FR) .................................. 1904206

(51) Int. Cl.  
*G06K 19/073* (2006.01)

(52) U.S. Cl.  
CPC .............. *G06K 19/07354* (2013.01)

(58) Field of Classification Search  
CPC ......... G06K 19/07354; G06K 19/0718; G06K 19/02; G06V 40/1306  
See application file for complete search history.

(56) References Cited

U.S. PATENT DOCUMENTS

| | | | |
|---|---|---|---|
| 5,665,526 A | | 9/1997 | Markovich et al. |
| 7,090,139 B2 * | | 8/2006 | Kasuga .............. G06K 19/0718 235/494 |
| 9,201,318 B2 * | | 12/2015 | Yu ......................... G03G 5/0564 |
| 9,342,774 B1 * | | 5/2016 | Lin .................... G06K 19/0718 |
| 2017/0293793 A1 | | 10/2017 | Lavin |

(Continued)

FOREIGN PATENT DOCUMENTS

| AU | 2013100054 A4 | 2/2013 |
|---|---|---|
| EP | 3 336 759 A1 | 6/2018 |

(Continued)

*Primary Examiner* — Seung H Lee  
(74) *Attorney, Agent, or Firm* — Harrington & Smith

(57) ABSTRACT

Biometric sensor module for a chip card, and method for producing such a module Method for producing a biometric sensor module for a chip card, including steps of providing a dielectric carrier including a front face and a back face, the front face being coated with an electrically conductive layer in which a bezel is formed, at least one conductive via being made in the thickness of the carrier to electrically connect the bezel to the back face, producing a protective layer on the front face, covering a protection area located inside the bezel, and attaching a biometric sensor for detecting fingerprints to the back face, a detection area covered by the sensor on the back face being placed opposite the protection area.

17 Claims, 3 Drawing Sheets

(56) References Cited

U.S. PATENT DOCUMENTS

2018/0330138 A1\* 11/2018 Suwald .............. G06V 40/1306
2019/0392436 A1\* 12/2019 Lee .................. G06K 19/07707

FOREIGN PATENT DOCUMENTS

| EP | 401 835 A1 | 11/2018 |
| WO | WO 2017/164791 A1 | 9/2017 |
| WO | WO 2018/066857 A1 | 4/2018 |
| WO | WO 2018/231130 A1 | 12/2018 |
| WO | WO 2019/058259 A1 | 3/2019 |

\* cited by examiner

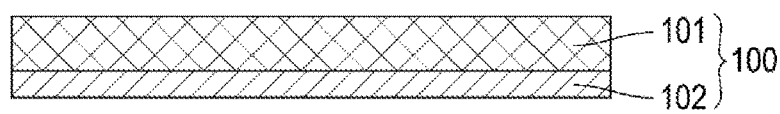
FIG. 3a
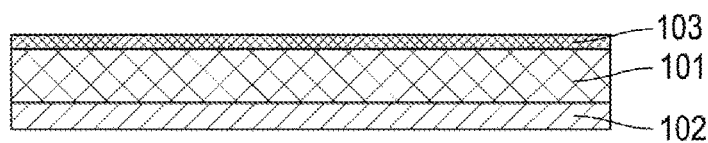
FIG. 3b
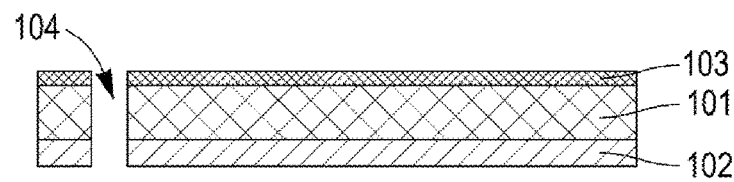
FIG. 3c
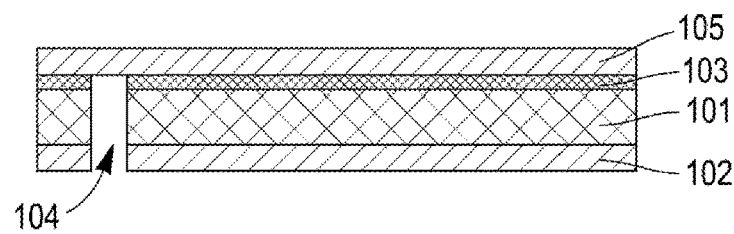
FIG. 3d
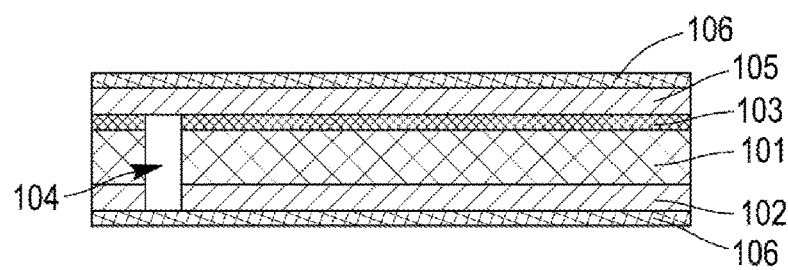
FIG. 3e
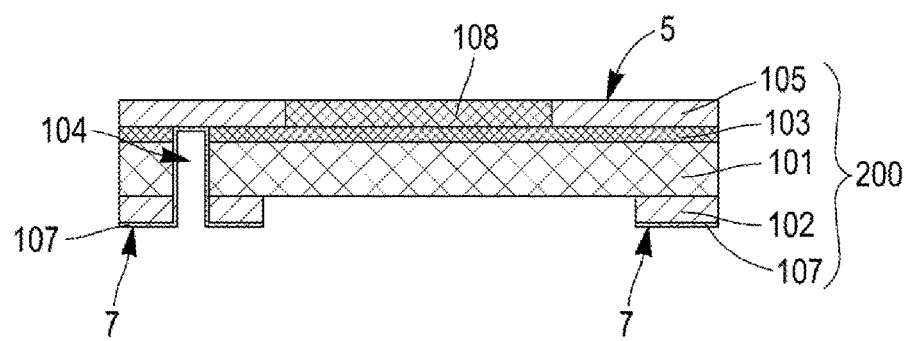
FIG. 3f1
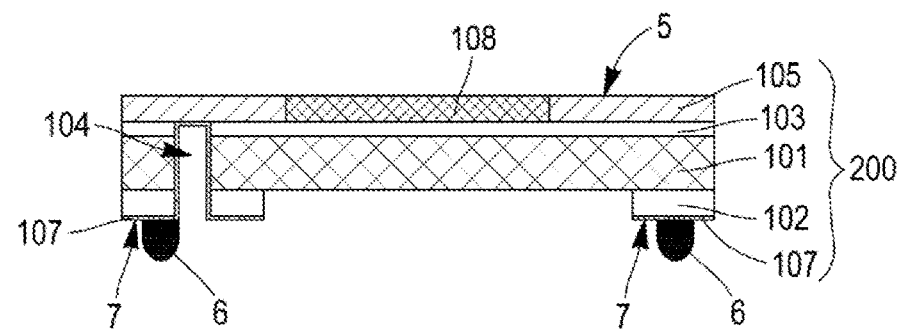
FIG. 3f2

BIOMETRIC SENSOR MODULE FOR A SMART CARD AND METHOD FOR MANUFACTURING SUCH A MODULE

CROSS REFERENCE TO RELATED APPLICATION

This patent application is a U.S. National Stage application of International Patent Application Number PCT/FR2020/000128 filed Apr. 16, 2020, which is hereby incorporated by reference in its entirety, and claims priority to FR 1904206 filed Apr. 19, 2019.

TECHNICAL FIELD

The invention relates to the field of chip cards.

PRIOR ART

In the field of chip cards, and notably in that of chip cards used as payment means, manufacturers are always wishing to offer users greater security. It has thus been proposed to integrate biometric sensors for reading fingerprints into chip cards. Reference may be made for example to patent applications WO2018066857A1 and WO2019058259A1 for examples of such cards.

For example, for cards benefiting from contact-based and contactless read modes, a module integrated into the card and comprising a biometric sensor may allow a transaction to be authorized only if the fingerprint of the card holder is detected. This type of card is described for example in the patent document published under the number EP 3 336 759 A1. To produce such a card, a cavity is milled into the card so as to expose an electrical circuit integrated beforehand into the body of the card and house the module there. The module then housed in this cavity is also electrically connected to the circuit.

It has been observed that the detection region on which a finger has to be placed in order for the fingerprint to be recognized is subject to a certain number of factors (humidity, sweat, mechanical abrasion, UV ageing, temperature, etc.) that are liable to degrade and/or prematurely wear this detection region. It may be contemplated to cover this detection surface with a protective layer. However, it is then necessary to find a material that makes it possible, all at once, to increase resistance to the aggressive factors to which the detection region is subject, also makes it possible not to interfere with the detection of the fingerprint, but is also compatible with all of the other steps of manufacturing, processing and embedding the biometric module.

The invention aims to find a solution for at least partially improving the protection of the detection region.

SUMMARY OF THE INVENTION

What is thus proposed according to the invention is a biometric sensor module for a chip card, comprising
 a dielectric carrier comprising a front face and a back face, both forming main faces of the carrier, and
 a biometric sensor for detecting fingerprints attached to the back face and extending beneath the back face over a detection area.
Additionally, this module comprises, on the front face, over a detection region extending opposite the detection area and over an area corresponding at least to that of the detection area, at least one protective layer comprising a photoimageable coverlay material, i.e. a photosensitive material.

Thus, by virtue of this layer of photoimageable coverlay material, it is possible to protect the carrier with a relatively mechanically and chemically resistant material, the use of which may be easily integrated into an industrial process, in particular into a reel-to-reel process, compatible with heating steps required for potential solder connection of the module to the circuit that is already integrated within the body of a card. Its photoimageable character is additionally compatible with the implementation of photolithography steps which are industrially controllable and compatible with high yields.

Preferably, the protective layer comprising the photoimageable coverlay material is based on epoxy-acrylate resins, the physicochemical properties of which, in particular in terms of hardness and abrasion resistance, are, after UV or thermal crosslinking, better than those which could be obtained with pure acrylates, for example. Likewise, epoxy-acrylate resins are easier to implement than epoxy resins.

This chip card module optionally comprises one and/or another of the following features, each considered independently of one another, or each in combination with one or more others:
 the protective layer has a thickness of between 5 and 100 micrometres, and more preferably has a thickness close to 25 micrometres;
 the protective layer is deposited on a layer of adhesive based on epoxy resin;
 a bezel is formed on the front face and the protective layer covers a region located inside the bezel;
 it comprises, on the back face, electrically conductive connection pads, these connection pads being placed essentially opposite a region of the front face covered with the bezel and at least one conductive via being made in the thickness of the carrier, this via electrically connecting the bezel to the connection pads;
 at least some of the connection pads each comprise at least one blob of solder material, this blob of solder material being deposited before or after assembly of the biometric sensor on the dielectric carrier, and preferably after assembly of the biometric sensor on the dielectric carrier.

According to another aspect, the invention relates to a chip card comprising a biometric sensor module according to the invention. This chip card comprises a card body with an electrical circuit integrated into the card body. The module and the circuit are electrically connected to one another using a solder material.

According to yet another aspect, the invention relates to a method for producing a biometric sensor module for a chip card, comprising steps of
 providing a dielectric carrier comprising a front face and a back face, both forming main faces of the carrier,
 attaching a biometric sensor for detecting fingerprints to the back face, a detection area covered by the sensor on the back face being placed opposite a detection region on the front face.
According to this method, a protective layer of a photoimageable coverlay material is additionally produced on the detection region.

This method optionally comprises one and/or another of the following features, considered independently of one another or each in combination with one or more others:
 the dielectric carrier is a flexible carrier from the polyimide family;

the front face is coated with an electrically conductive layer, in which a bezel is made, the protective layer covering an area located inside the bezel on the front face;

at least one conductive via is made in the thickness of the carrier to electrically connect the bezel to the back face;

the carrier is provided with a first electrically conductive layer on the back face, and then the front face is coated with an adhesive layer;

at least one hole, intended to form the via, is made, this hole passing through the first conductive layer, the carrier and the adhesive layer;

a second electrically conductive layer is laminated on the back face, this second conductive layer at least partially covering the hole intended to form the via;

the bezel is etched in the second conductive layer, while leaving the hole intended to form the via at least partially covered with the second conductive layer;

the protective layer is deposited, inside the bezel, on the adhesive layer exposed during the etching of the bezel;

connection pads are etched in the first conductive layer so that at least some of them are positioned essentially opposite a region of the front face covered with the bezel;

the biometric sensor is attached to the back face of the carrier using an adhesive for attaching chips (die attach) which crosslinks at temperatures of between 100° C. and 150° C.;

at least one blob of solder is deposited on at least some of the connection pads.

BRIEF DESCRIPTION OF THE DRAWINGS

Further aspects, aims and advantages of the invention will become apparent from reading the following detailed description, and with reference to the appended drawings, which are given by way of non-limiting examples and in which.

DETAILED DESCRIPTION

Figure 1:
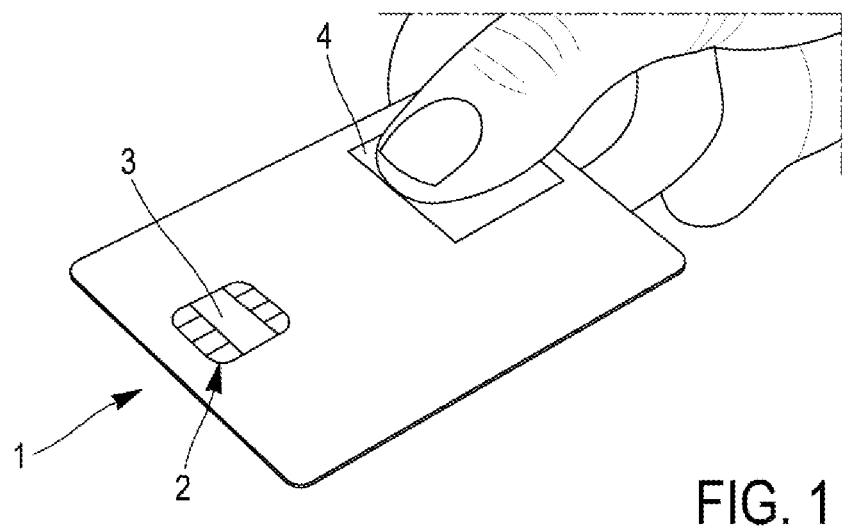
FIG. 1 schematically shows a perspective view of a chip card according to a first example of an embodiment of the invention.

One example of a chip card 1 according to the invention is shown in FIG. 1. In this example, the card 1 is a bank card in the ID-1 format. This card 1 has a first module 2 comprising a connector 3 and an electronic chip (underneath the connector). The connector 3 makes it possible to electrically connect the electronic chip to a card reader in order to exchange data between the chip and the card reader.

In the case of dual-interface cards, that is to say allowing contact-based or contactless reading, this card 1 also has an antenna integrated into the body of the card 1. This antenna is connected for example to the chip situated in the first module 2. This antenna allows the contactless exchange of data between the chip and a contactless card reader. This antenna, or another part of an electrical circuit situated in the body of the card 1, is also electrically connected to a second module 4 integrated into the card 1. The second module 4 is a biometric module. This biometric module 4 comprises a sensor for fingerprint recognition. The second module 4 makes it possible to determine whether the fingerprint read by the sensor corresponds to that of a user authorized to use this card 1. In this case, contactless communication between the chip and a reader may be authorized.

Figure 2:
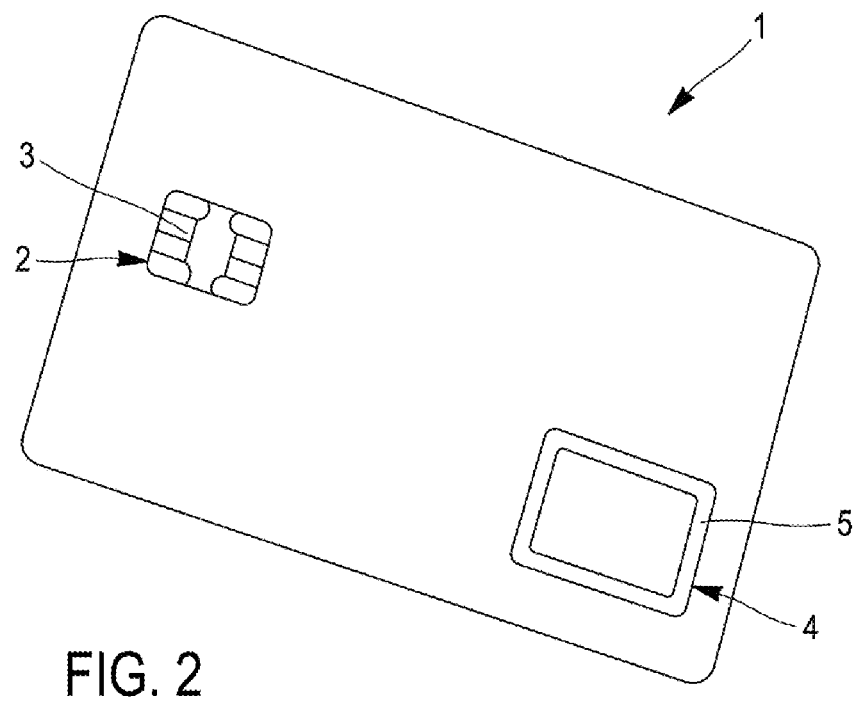
FIG. 2 schematically shows a perspective view of a chip card according to a second example of an embodiment of the invention.

The exemplary embodiment of the card 1 shown in FIG. 2 differs from that shown in FIG. 1 essentially in that the second module 4 comprises a conductive border 5 (bezel 5) which may be continuous or not continuous. The bezel 5 is electrically connected to the biometric sensor located on the back face of the second module 4. It allows the removal of potential electrostatic charge which might damage the sensor or prevent the sensor from reading a fingerprint. In FIG. 2, the bezel 5 is in the shape of a continuous ring. According to some variants, the bezel 5 may consist of a plurality of conductive segments, or points, arranged around the region on which a finger is to be placed in order to read the corresponding fingerprint.

The method for producing a module of the type illustrated in FIG. 2 is described below.

Figure 3G:
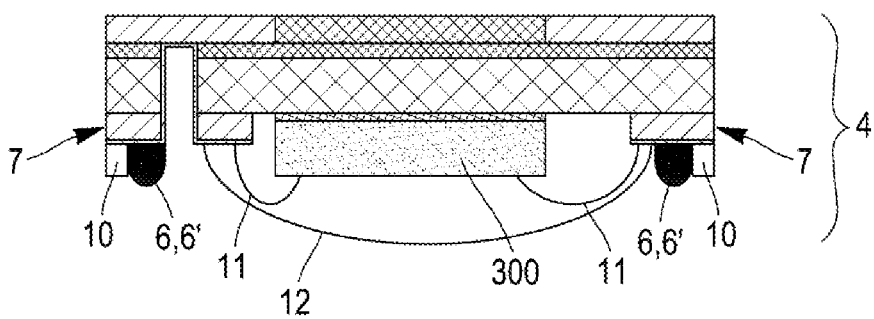
FIG. 3 schematically shows a sectional view of various steps of one example of a method for producing a biometric sensor module, such as the one integrated into the card shown in FIG. 2.

This process comprises:

Providing a complex material 100 comprising a carrier 101 made of dielectric material, on which a sheet consisting of an electrically conductive material 102 is laminated (see FIG. 3a); for example, the dielectric material is a polyimide the thickness of which is between 25 and 75 micrometres, and is preferably equal to 50 micrometres, and the first electrically conductive material 102 is a copper alloy the thickness of which is between 12 and 35 micrometres, and is preferably equal to 18 micrometres; for effective implementation of the method according to the invention on an industrial scale, this complex material 100 (copper clad) is advantageously provided in a reel and the method is implemented reel-to-reel;

Coating, with an adhesive material 103, the face of the dielectric material opposite that on which the first electrically conductive material is laminated (see FIG. 3b); the adhesive material 103 is, for example, an epoxy resin, potentially modified with mineral fillers and resins; the adhesive material 103 is thus deposited with a thickness of between 10 and 25 micrometres; the adhesive material 103 potentially undergoes a process of continuous drying in order to remove the solvents present in the formulation when it is deposited;

Perforating holes 104 through the new complex material comprising the dielectric carrier 101, the layer of the first electrically conductive material 102 and the layer of adhesive material 103 (see FIG. 3c);

Laminating a layer of a second electrically conductive material 105; for example, this second electrically conductive material is a copper alloy, the thickness of which is between 12 and 35 micrometres, and preferably this thickness is equal to 18 micrometres; this layer consisting of the second electrically conductive material 105 closes off the holes 104 (see FIG. 3*d*); the adhesive material 103 potentially undergoes a step of crosslinking following a defined cycle with temperature plateaus suitable for the chemistry of the adhesive material 103;

Laminating a dry photoresist film 106 on each of the two main faces of the complex obtained on completion of the preceding step (see FIG. 3*e*), followed by light exposure through a mask and lifting of the photoresist to form patterns used in subsequent steps;

etching certain regions of the layers of first 102 and second 105 electrically conductive materials;

electrolytically depositing layers of metals 107 (copper, nickel, gold, palladium, or silver, for example) which are intended to facilitate the soldering of connection wires to the second conductive material and/or to produce conductive vias between the first 102 and the second 105 conductive material at the holes 104;

depositing a layer of a protective material 108 on a detection region; this protective material 108 is, for example, a photoimageable coverlay material, i.e. a photosensitive material; for example, the layer of protective material 108 has a thickness of between 15 and 50 micrometres, and is, for example, equal to 25 micrometres; for example, the layer of protective material 108 is deposited as a film laminated on the front face of the carrier 101; for example the layer of protective material 108 is deposited in the form of an epoxy-acrylate film (for example, it is the product sold under the reference by Ethernal (www.eternal-group-.com); alternatively, the layer of protective material 108 is deposited by using a screen printing technique; as another alternative, the layer of protective material 108 is deposited using a technique akin to that of inkjetting; as another alternative, the layer of protective material 108 is deposited using a coating technique; the protective layer 108 extends on the front face over an area corresponding to a detection region; and in the case that the layer of a protective material 108 is deposited using a non-selective deposition technique, after deposition of the layer of a protective material 108, it may be necessary to carry out a step of exposure to suitable radiation through a mask, followed by a chemical development step;

a step of thermally crosslinking the protective layer.

According to one particular mode of implementation of the method according to the invention, a solder material 6 is deposited on connection pads 7 produced in the layer of the first conductive material 102 in the preceding steps. For example, the solder material 6 is a tin-bismuth or tin-bismuth-silver alloy; for example, the solder material 6 is deposited using screenprinting or jetting. Additionally, instead of making the holes 104 conductive using electrolytic depositions of layers of metals 107, it is also possible to take advantage of this step of depositing a solder material 6 to deposit this material in the holes 104 and thereby make them conductive between the layers of the first 102 and of the second 105 conductive materials.

Figure 5:
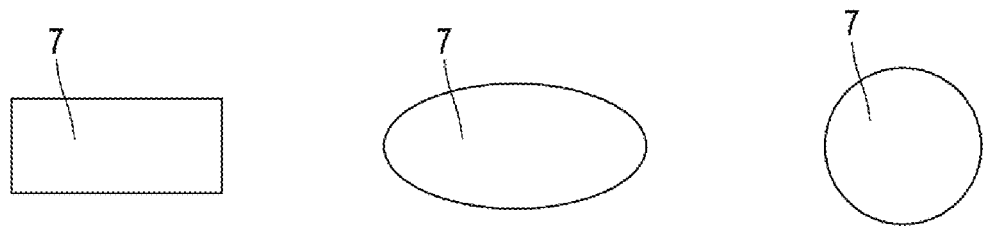
FIG. 5 schematically shows various variants that are conceivable for the shape of the connection pads placed on the back face of a biometric sensor module obtained using a method such as the one illustrated in FIG. 3.

The solder material 6 may be deposited on connection pads 7 of various shapes (see FIG. 5). For example, these shapes have an essentially continuous perimeter which delimits a rectangular, rhomboid, square, oval, or round shape.

As an alternative, instead of depositing a solder material 6 on the connection pads 7, these are left untouched until the operation of embedding the module 4 in the card 1. Then, during the embedding operation, prior to installing the module 4 in the cavity 208 formed (for example by milling) in the card body, a solder material 6, a paste or an anisotropic conductive film 6' is deposited on the connection pads 7 in order to establish a connection with the circuit 200 housed in the card body (see FIGS. 3 and 4). When a paste or an anisotropic conductive film 6' is used, the connection pads 7 may take a shape such as those described above with reference to FIG. 5 or else they may take a shape with extensions 10 allowing better adhesion of the paste or better performance in terms of electrical conductivity of the anisotropic conductive film 6' on the connection pads 7.

Figure 6:
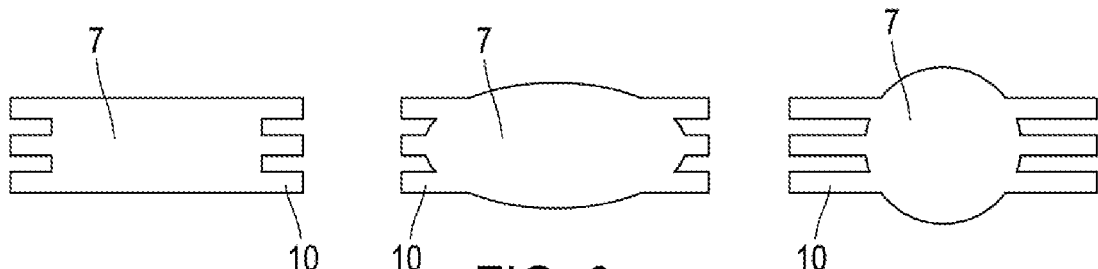
FIG. 6 schematically shows yet other variants that are conceivable for the shape of the connection pads placed on the back face of a biometric sensor module obtained using a method such as the one illustrated in FIG. 3.

However, more advantageously, the connection pads 7 have a shape that is compatible both with the use of a solder material 6 and with a paste or an anisotropic conductive film 6'. To that end, the connection pads 7 may take shapes comprising a rectangle, a rhombus, a square, an oval, or a disc, and lateral extensions 10 (see FIG. 6).

At the end of the above steps, a reel bearing biometric sensor carriers 200 for a chip card is obtained. Each of these carriers 200 has a structure corresponding, for example, to that shown in FIG. 3/1 or in FIG. 3/2 depending on whether the biometric sensor is assembled after or before the deposition of the solder paste 6 on the lands 7. Each carrier 200 therefore comprises:

A front face, with a bezel 5 formed in the layer of the second conductive material 105, a protective layer 108 deposited on the layer of adhesive material 103, at a detection region located inside the ring formed by the bezel 5;

A back face with connection pads 7, possibly with a blob of a solder material 6 deposited on at least some of these connection pads 7 in order to be able to subsequently connect a module 4 to a circuit 200 integrated into the card body.

For the purpose of being used and integrated into a chip card, each carrier 200 is equipped with a biometric fingerprint sensor 300. This biometric sensor 300 is fastened to the back face for example using a known die attach technology. For example, the biometric sensor 300 is fastened to the back face of the carrier 101 using a thermosetting adhesive that sets at temperatures between 100° C. and 150° C. and that has the property of migrating, through capillary action, under the entire surface of the sensor without generating any gaps or bubbles ("underfill").

A solder material 6 is deposited on connection pads 7 before or after the biometric sensor 300 is assembled, but preferably after in order to avoid the biometric sensor 300 experiencing a thermal shock during the operation of reflow of the solder paste forming the solder material 6.

Likewise, the solder material 6 is deposited using screen-printing or jetting.

The solder material 6 is preferably deposited on connection pads 7 by jetting if the biometric sensor 300 is already assembled on the dielectric carrier 101.

The biometric sensor 300, on the back face, occupies an area corresponding essentially to a detection area located opposite the detection region on which the protective layer 108 is deposited. This biometric sensor 300 is connected to the connection pads 7 and to the bezel 5 using a known technique, such as the flip-chip technique or the wire-bonding technique using wires 11. Advantageously, the biometric sensor 300 and its possible conductive wires 11 are protected in an encapsulating resin 12. A hotmelt adhesive 10 is possibly also arranged on the back face on or next to the connection pads 7. This hotmelt adhesive 10 is intended to fasten the biometric sensor module 4 in the cavity 208 formed in the body of a chip card.

When the module 4 is embedded in a card body, there are several possible options for establishing a connection between the connection pads 7 of the module and the circuit 200 that is integrated into the card body. It is possible, for example, to solder the connection pads 7 directly to the circuit 200 using the solder material 6 deposited on the connection pads 7 (see FIG. 4). As an alternative, it is possible to deposit blobs 206 of a solder material on the circuit 200 and form a connection between the solder pads 7 and the circuit 200 by melting one, the other or both solder materials that have been deposited beforehand, each respectively, on the connection pads 7 and on the circuit 200. More particularly, for example, it is possible to deposit a first solder material 6 on the connection pads 7 and a second solder material 206 on the circuit 200. The first solder material 6 is then advantageously a solder material having a low melting temperature (for example a melting temperature lower than or equal to 140° C.), the second solder material 206 having a higher melting temperature close or identical to that of the first solder material 6. Advantageously, the use of a second solder material 206 with a higher melting temperature makes it possible to limit the risk of creep of the one or more solder materials into and towards the edge of the cavity 208, or even out of same.

For example, to make the connection between the connection pads 7 and the circuit 200, a thermode 400 is placed on the bezel 5. Since the bezel 5 is advantageously opposite the connection pads 7 on either side of the carrier 101, there is thus a particularly good thermal conduction between the two faces of the carrier 101.

Using a first solder material 6 with a low melting temperature (lower than or equal to 140° C.) on the connection pads 7 and a second solder material 206 with a higher melting temperature on the circuit 200, the thermode 400, heated for example to a temperature of 230° C., is applied for 2.5 seconds. The heat provided by the thermode 400 also dissipates into the hotmelt adhesive 10 so as to adhesively bond the module 4 in the card 1.

Using a first solder material 6 with a low melting temperature (lower than or equal to 140° C.) on the connection pads 7 and a second solder material 206 on the circuit 200 having a melting temperature equal to, close to or lower than that of the first solder material 6, the thermode 400, heated for example to a temperature of 230° C., is applied for 1.5 seconds. The method according to the invention is therefore faster in this case. Furthermore, using solder materials 6, 206 with a low melting temperature makes it possible to use a thermode 400 with a smaller carrier surface, thereby possibly helping to better control creep and to limit risks of deformation of the card 1 and/or of the module 4.

Generally speaking, it is possible to use an electrically conductive adhesive or paste 6', an anisotropic conductive film or a solder material 6 to connect the module 4 to the circuit 200. However, in any case, the method described above or variants thereof are advantageously used by producing connection pads 7 having a shape that is compatible both with the use of a solder material 6 and with a paste or an anisotropic conductive film 6', this shape possibly being rectangular, rhomboid, square, an oval or a disc shape, and also with radial or lateral extensions 10 (see FIG. 6). The module 4 according to the invention is then the same whether it is connected through soldering or using a conductive adhesive. This makes it possible to produce the module 4 in larger runs, while still leaving the embedder the option of choosing one or the other of the connection technologies.

Figure 4:
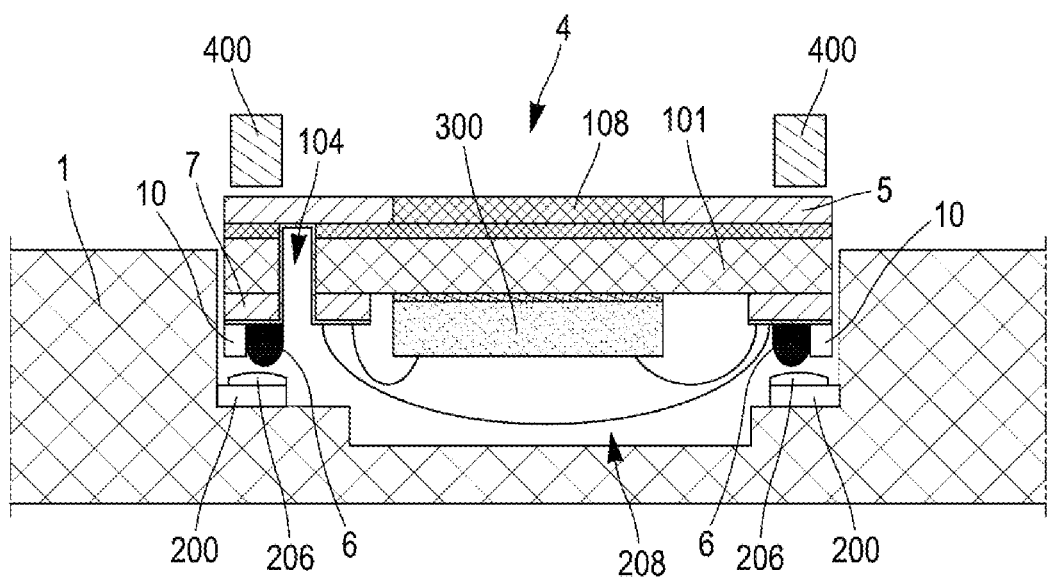
FIG. 4 schematically shows a sectional view of the integration of a biometric sensor module, obtained using a method such as the one illustrated by FIG. 3, into a card.

The production and embedding of a module 4 comprising a bezel 5 on the front face has been described with reference to FIGS. 2, 3 and 4. In the case, for example, that the biometric sensor 300 is not, or not very, sensitive to electrostatic charge, the bezel 5 may be omitted (see FIG. 1). The method described above is then easily simplified. The production of the holes 104 may be omitted. It is also possible to use just one sheet of conductive material 102 (the steps illustrated by FIGS. 3c and 3d are thus omitted in particular). The conductive material 102 is then placed only on the back face of the carrier 101, to form the connection pads 7. The protective layer 108 is produced so as to cover at least the detection region located opposite the detection area of the sensor 300. The protective layer 108, besides its function of actually protecting the carrier 101, indicates where to place a finger to detect the fingerprint. The protective layer 108 may be coloured in different colours in order, for example, to harmonize it with the colour of the card 1.

The protective layer 108 potentially consists of an ink or comprises an ink. For example, it is an epoxy-acrylate-based ink. For example, it is the product sold under the reference SD 2444 NB-M by Peters (www.peters.de).

The invention claimed is:

1. Biometric sensor module for a chip card, comprising:
    a dielectric carrier comprising a front face and a back face, both forming main faces of the carrier,
    a biometric sensor for detecting fingerprints attached to the back face and extending beneath the back face over a detection area located opposite a detection region located on the front face of the carrier,
    the module further comprising:
        on the front face, over the detection region extending opposite the detection area and over an area corresponding at least to that of the detection area, at least one protective layer comprising a photoimageable coverlay material,
        a bezel on the front face, where the protective layer covers a region located inside the bezel,
        on the back face, electrically conductive connection pads, where the electrically conductive connection pads are essentially opposite a region of the front face covered with the bezel, and
        at least one conductive via in the thickness of the carrier, the at least one conductive via electrically connecting the bezel to the electrically conductive connection pads.

2. Module according to claim 1, in which the photoimageable coverlay material is based on epoxy-acrylate resins.

3. Module according to claim 1, in which the protective layer has a thickness of between 5 and 100 micrometres.

4. Module according to claim 3, in which the protective layer has a thickness of about 25 micrometres.

5. Module according to claim 1, in which the protective layer is deposited on a layer of adhesive based on epoxy resin.

6. Module according to claim 1, in which at least some of the connection pads each comprise at least one blob of solder material.

7. Chip card comprising a card body with an electrical circuit integrated into the card body and the module according to claim 1, the module and the circuit being electrically connected using a solder material.

8. Method for producing a biometric sensor module for a chip card, comprising steps of:
    providing a dielectric carrier comprising a front face and a back face, both forming main faces of the carrier, attaching a biometric sensor for detecting fingerprints to the back face, a detection area covered by the sensor on the back face being placed opposite a detection region located on the front face of the carrier, providing a protective layer of a photoimageable coverlay material on the detection region, providing a bezel on the front face, where the protective layer covers a region located inside the bezel, and on the back face, providing electrically conductive connection pads, where the electrically conductive connection pads are placed essentially opposite a region of the front face covered with the bezel, and providing at least one conductive via in the thickness of the carrier, the at least one conductive via electrically connecting the bezel to the electrically conductive connection pads.

9. Method according to claim 8, in which the dielectric carrier is a flexible carrier from the polyimide family.

10. Method according to claim 8, in which the biometric sensor is attached to the back face of the carrier using an adhesive for attaching chips which crosslinks at temperatures of between 100° C. and 150° C.

11. Method according to claim 10, in which at least one blob of solder is deposited on at least some of the connection pads.

12. Method according to claim 8, where the front face is coated with an electrically conductive layer, in which the bezel is made, the protective layer covering an area located inside the bezel on the front face, and where the at least one conductive via is made in the thickness of the carrier to electrically connect the bezel to the back face.

13. Method according to claim 12, in which:

the carrier is provided with another electrically conductive layer on the back face, and then the front face is coated with an adhesive layer, at least one hole, intended to form the via, is made, this hole passing through the another conductive layer, the carrier and the adhesive layer, where the another electrically conductive layer is laminated on the back face, said conductive layer at least partially covering the hole intended to form the via, where the bezel is etched in said conductive layer, while leaving the hole intended to form the via at least partially covered with said conductive layer, where the protective layer is deposited, inside the bezel, on the adhesive layer exposed in the etching of the bezel.

14. Method according to claim 13, in which connection pads are etched in the another conductive layer so that at least some of them are positioned essentially opposite a region of the front face covered with the bezel.

15. Method for producing a biometric sensor module for a chip card, comprising steps of:

providing a dielectric carrier comprising a front face and a back face, both forming main faces of the carrier, attaching a biometric sensor for detecting fingerprints to the back face, a detection area covered by the sensor on the back face being placed opposite a detection region located on the front face of the carrier, providing a protective layer of a photoimageable coverlay material on the detection region, where the front face is coated with an electrically conductive layer, in which the bezel is made, the protective layer covering an area located inside the bezel on the front face, and where the at least one conductive via is made in the thickness of the carrier to electrically connect the bezel to the back face.

16. Method according to claim 15, in which:

the carrier is provided with another electrically conductive layer on the back face, and then the front face is coated with an adhesive layer, at least one hole, intended to form the via, is made, this hole passing through the another conductive layer, the carrier and the adhesive layer, where the another electrically conductive layer is laminated on the back face, said conductive layer at least partially covering the hole intended to form the via, where the bezel is etched in said conductive layer, while leaving the hole intended to form the via at least partially covered with said conductive layer, where the protective layer is deposited, inside the bezel, on the adhesive layer exposed in the etching of the bezel.

17. Method according to claim 16, in which connection pads are etched in the another conductive layer so that at least some of them are positioned essentially opposite a region of the front face covered with the bezel.

* * * * *